Jan. 19, 1965

L. T. BARNES 3,166,695

TRIMMER CAPACITOR

Filed Oct. 12, 1960

INVENTOR.
LLEWELLYN T. BARNES

BY

*Amster & Levy*

ATTORNEYS

Jan. 19, 1965

L. T. BARNES 3,166,695

TRIMMER CAPACITOR

Filed Oct. 12, 1960

INVENTOR.
LLEWELLYN T. BARNES

BY

Amster & Levy
ATTORNEYS 3,166,695
TRIMMER CAPACITOR
Llewellyn T. Barnes, 155 Atlantic Ave., Freeport, N.Y., assignor of one-third to Charles T. Barnes, Freeport, and one-third to John F. Woog, Garden City, N.Y.
Filed Oct. 12, 1960, Ser. No. 62,295
3 Claims. (Cl. 317—249)

My invention relates to improvements in variable electrical capacitors and specifically, to capacitors of the trimmer type which are used to produce precise capacity variations.

Trimmer capacitors of the type exemplified by United States Patent No. 2,607,826 issued to me on August 19, 1952 include a cylindrical body made of dielectric material. A band of conductive material is sprayed on the outside of this cylinder adjacent one end thereof and serves as the fixed plate of the capacitor. The movable electrode comprises a piston and a screw of conductive material formed integrally thereon and threaded throughout its length and received by a threaded bushing at one end of the cylinder, thus, rotation of the screw will result in rotation and axial movement of the piston relative to the fixed band, thereby changing the capacity of the unit.

An anti "back-lash" mounting means is provided in this aforementioned trimmer capacitor and includes a nut in threaded engagement with the screw, means to prevent the nut from turning as the screw rotates, and a spring exerting pressure on the nut to bias the nut into firm engagement with the screw at all times.

While this type of piston trimmer provides effective operation, it presents the drawbacks of requiring careful machining of parts, particularly the piston and screw since they are formed integrally and the screw is threaded throughout its length. Furthermore, the bushing must be tapped and threaded to receive the screw, and means provided in the bushing to prevent rotation of the aforesaid nut. These various machining operations not only incur high production costs but also increase assembly time of the unit.

In accordance with the invention herein, there is provided a piston trimmer type capacitor having a cylindrical body of a high dielectric material. An adjusting member, which is threaded for only a small distance at one end, is frictionally mounted in a bushing attached to the cylindrical body. The threaded end of the adjusting member is in threaded engagement with one end of an internally threaded piston. The other end of the piston is attached to a washer having a square aperture which coacts with a square projection within the cylinder and thereby prevents the piston from rotating. Thus, rotation of the screw will result in only longitudinal motion of the piston relative to the metal band which serves as the fixed plate on the outside of the cylinder.

Another feature of my invention provides a square shank portion adjacent the head of the adjusting member and a notch formed in the adjusting member between the square shank portion and the threaded end portion of the adjusting member. A washer fits upon the square shank portion and abuts the rear wall of the bushing. A second washer is mounted on the notch in the adjusting member and a spring is compressed between the two washers, thereby exerting biasing force on the second washer which always keeps the adjusting member under tension, thus eliminating backlash.

One of the objects of the invention is to provide a piston type trimmer capacitor of the character described which requires a minimum of machining to produce.

Another object of the invention is to provide a simple means of eliminating backlash in a piston-type trimmer capacitor of the character described.

A further object of the invention is to provide a trimmer-type piston capacitor which is composed of few parts, is simple to construct and assemble, lends itself to mass production techniques, and at the same time is effective to prevent rotation of the piston.

Additional objects and advantages of the invention will become apparent during the course of the following specification when taken in connection with the accompanying drawings, in which.

Figure 2:
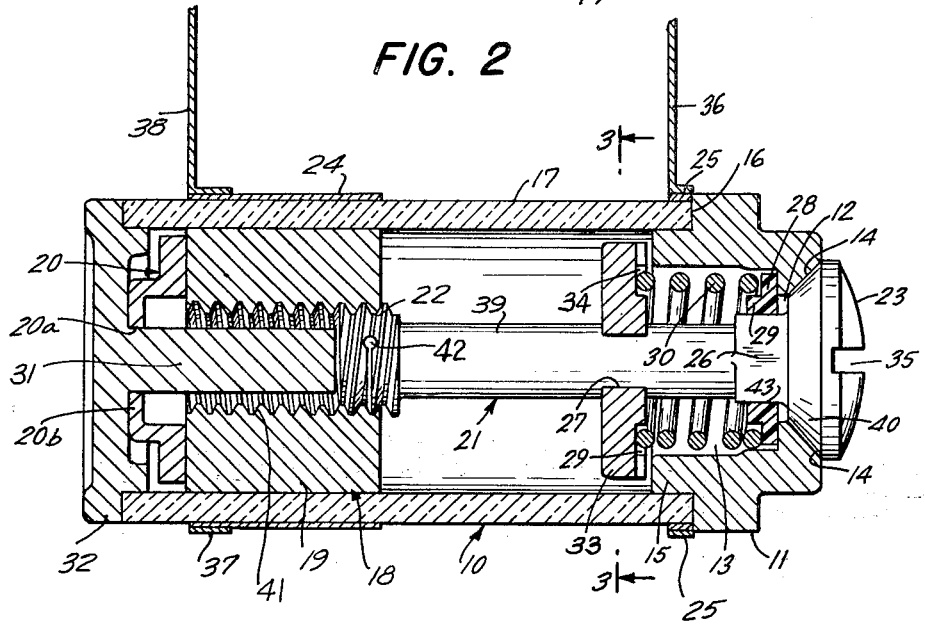
FIG. 2 is a central longitudinal section through the capacitor of FIG. 1.
Figure 4:
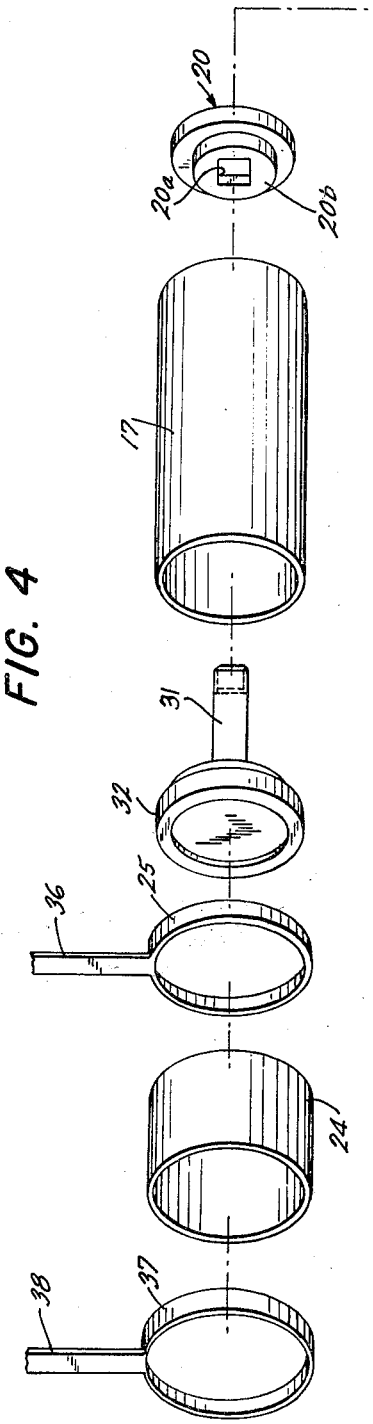
FIG. 4 is an exploded perspective view of the capacitor of FIGS. 1–3.
Figure 4:
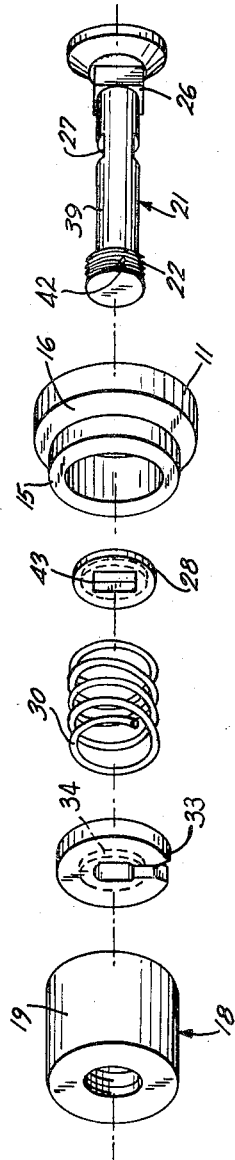

Referring in detail to the drawings, particularly to FIGS. 2 and 4, there is shown a capacitor 10 made in accordance with the invention and having a front end bushing 11. The bushing 11 is formed with a central aperture 12 communicating with an inner bore or chamber 13. The bushing 11 also has a chamfered or tapered forward surface 14 adjacent aperture 12 for a reason hereinafter explained. Bushing 11 is also provided with an external circumferential flange 16 from which projects an end annular flange 15 of reduced diameter.

A hollow cylinder 17, made of a dielectric material such as quartz, glass, "Titania" or the like, is rigidly and concentrically attached to the bushing 11. A band 24 of a conductive metal such as silver, is fitted about the outer surface of cylinder 17 adjacent the rear end thereof, and is secured to said cylinder outer surface, as by cementing. As an alternative, the band may be sprayed on the cylinder surface and then fired.

The annular flange 15 of bushing 11 is inserted within the front open end of cylinder 17 and secured therein as by cementing, with the end of cylinder 17 abutting flange 16 and chamber 13 communicating with the interior of cylinder 17, as shown in FIG. 2.

The capacitor 10 also includes an adjusting member indicated generally by reference numeral 21 and comprising a cylindrical shank 39 terminating at one end in an enlarged threaded portion 22. The other end of shank 39 carries a square shank portion 26 which is formed integrally with a terminal head piece 23. The head piece 23 has a tapering inner portion 40 which joins the square shank portion 26 and which is complementary to the tapered surface 14 of bushing 11 adjacent aperture 12. Thus, adjusting member 21 in assembly can be inserted through aperture 12 of bushing 11 until the tapering portion 40 of head piece 23 is seated upon the tapered surface 14 of said bushing 11.

The conductive band 24 constitutes a fixed electrode of the condenser 10 exteriorly of the dielectric wall of cylinder 17. The condenser 10 also includes a movable electrode designated generally by reference numeral 18 on the inner surface of cylinder 17. Electrode 18 is slidable in cylinder 17 and comprises a cylindrical metal piston 19 having a central threaded bore 41, and a washer 20, made of non-conductive material, cemented to one end of piston 19. Washer 20 is provided with a square central aperture 20a which is in alignment with the threaded bore 41 of piston 19. The bore 41 is in threaded engagement with threaded portion 22 of adjusting member 21.

The cylinder 17 is closed off by an end cap 32 which is force-fitted within the rear open end of cylinder 17, and is provided with an integral inwardly-projecting post 31 of square cross-section. Post 31 is sized to fit within the square aperture 20a of washer 20. Thus, while washer 20 can slide along post 31, neither washer 20 nor the piston 19 carried thereby can rotate relative to post 31 or cylinder 17.

Electrode 18 therefore is constrained to move longitudinally through cylinder 17 without rotation therein.

Figure 1:
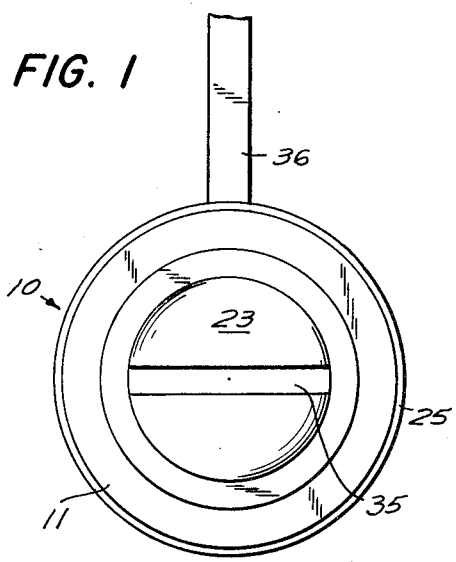
FIG. 1 is an end elevational view of a capacitor made in accordance with the invention.
Figure 3:
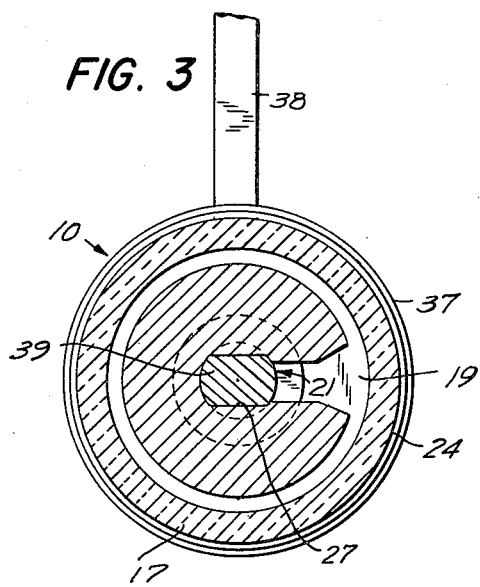
FIG. 3 is a transverse section taken along 3—3 of FIG. 2.

The shank 39 of adjusting member 21 is formed with a notch 27 which is sized to frictionally receive and retain a horseshoe-shaped washer 33, as shown in FIGS. 2 and 3. The washer 33 has an annular recess or groove 34 cut in its outer face and serving as a spring seat, as will be presently described. A circular washer 28 made of insulating material such as nylon, contains a square aperture 43 which fits about the square shank portion 26 so that while the insulated washer 28 may be slid longitudinally along said square shank portion 26, it cannot be rotated thereon. The washer 28 has a recessed annular groove 29 on its inner surface which serves as a spring seat. The body of washer 28 is sufficiently flexible and resilient to permit the washer to be deformed and stretched so that its square aperture 43 may pass over the shank threaded portion 22 when washer 28 is mounted on adjusting member 21.

A compression spring 30 is mounted within chamber 13, one end of said spring 30 being seated in the annular groove 29 of washer 28 and the other end of spring 30 being seated in groove 34 of washer 33. The spring 30 thus presses the insulated washer 28 against the end wall of bushing 11 and also biases the washer 33 and the adjusting member 21 carried thereby in a forward direction, that is to say, toward the left as viewed in FIG. 2. This spring tension upon adjusting member 21 presses the tapering inner portion 40 of head piece 23 against the tapered surface 14 of bushing 11 and thus provides some amount of frictional binding force upon head piece 23, effecting a finer adjustment in the turning of said head piece, and also tending to eliminate back-lash in the setting of adjusting member 21. Thus, spring tension upon adjusting member 21 permits smooth, uniform, fine adjustment of piston electrode 18 and maintains adjusting member 21 in an exact adjusted position even when subjected to jarring, vibration, or the like. The engaging tapered surfaces 14 and 40 also provide good electrical contact between the bushing 11 and adjusting member 21.

A keyhole-like slot 42 is provided in the threaded end portion 22 of shank 39, the slot 42 permitting a slight deformation in the length of said threaded end portion 22. The end of the threaded end portion 22 is slightly spaced from the facing end of the square post 31 to permit spring 30 to exert a biasing force on the adjusting member 21. Under tension of spring 30, the sections of the threaded shank portion 22 are pressed together, bringing the external threading slightly out of alignment with the meshing internal threading 41 of piston electrode 19, and thereby creating a drag on this screw threading. This tensioned drag serves to provide fine adjusting movement of the piston electrode 19, and also holds the latter in precise adjusted position at all times, also eliminating back-lash and creepage.

The head member 23 is provided with a kerf 35 at the outer end thereof for the reception of a screw driver or similar bladed tool which may be used to facilitate the rotation thereof during adjustment.

The piston 19, front end bushing 11, and adjusting member 21, are made of a conductive metal which has an extremely low coefficient of thermal expansion. A metallic, or electrically conductive ring 25, which bears a terminal post 36 is placed around the front end of cylinder 17 and is affixed thereto in abutment with bushing 11. Thus, terminal post 36 is electrically connected to bushing 11.

Ring 37 and integral terminal post 38, which are identical to the aforementioned ring 25 and post 36, are secured to the band 24 of cylinder 17 by soldering.

As was previously indicated, the metallic band 24 constitutes the fixed electrode of the capacitor 10. The band 24 and piston 18 are separated by the body of cylinder 17 which has a high dielectric constant. The capacitance of the unit is changed by rotating adjusting screw 21, this rotation being translated into longitudinal movement of piston 18 relative to fixed band 24. The piston 18 receives its charge through terminal 36, ring 25, bushing 11 and adjusting member 21.

In the position of the capacitor shown in FIG. 2, the piston 19 is in registry with the fixed electrode band 24, constituting the position of maximum capacitance. When the shank 39 is rotated by manual turning of the head 23, the piston 19 travels in a right-hand direction (as viewed in FIG. 2) away from the band 24 and the area of registry of the electrodes gradually decreases until the forward edge of the piston 19 reaches the rearward (or right-hand) edge of the band 24, constituting the position of minimum capacitance. To permit such position to be reached, the washer 20 is cupped or depressed at its center, as indicated at 20b in FIG. 2, this depressed central area providing clearance about the shank threaded end portion 22 when the piston approaches its position of minimum capacitance.

Thus, it is seen from the above description, the only pieces of capacitor 10 which require extensive machining are the threaded portion 22 and internally threaded member 19. The complete unit is easily assembled with a minimum of cementing and soldering. Thus, production costs and assembling costs are considerably decreased and the capacitor is capable of being more economically manufactured than was heretofore feasible.

While a preferred embodiment of the invention has been shown and described herein, it is obvious that numerous changes, additions and omissions may be made in such embodiment without departing from the spirit and scope of the invention.

What I claim is:

1. A trimmer capacitor comprising a hollow cylinder formed of a material having a high dielectric constant, a bushing frictionally interfitting with and closing off one end of said cylinder, said bushing having a through aperture communicating with the interior of said cylinder, a rotatable adjusting member having a head located outside said bushing and a shank carried by said head and extending rotatably through said bushing into the interior of said cylinder, an externally-threaded terminal portion at the end of said shank, a cylindrical piston electrode slidable in said cylinder and having an internally-threaded bore receiving the threaded terminal portion of said shank, said piston carrying a member having a non-circular aperture in communication with said threaded bore, and an end cap secured to the end of said cylinder opposite said bore and having a longitudinally-extending post of non-circular cross-section, said post fitting slidably within said non-circular aperture and preventing rotation of said piston electrode within said cylinder whereby said piston electrode is moved longitudinally through said cylinder when the shank is rotated, the threaded terminal portion of said bore having a transverse slot therein, the free end of said post engaging the free end of said threaded terminal portion, and a spring between said bushing and said shank urging the latter into firm engagement with said post whereby said slot is compressed by said post to deform the threading on said terminal portion and create a tensioned drag on said piston electrode for facilitating fine adjustment thereof.

2. A trimmer capacitor according to claim 1 in which said bushing has a tapered forward surface and said shank head has a corresponding tapered surface having a flush engagement therewith, said spring urging said shank in an inward direction and pressing the shank head tapered surface against the tapered forward surface of said bushing.

3. A trimmer capacitor comprising a hollow cylinder formed of a material having a high dielectric constant, a bushing frictionally interfitting with and closing off one end of said cylinder, said bushing having a through aperture communicating with the interior of said cylinder, rotatable adjusting member having a head located outside said bushing, a shank carried by said head and extending rotatably through said bushing into the interior of said cylinder, an externally-threaded terminal portion at the end of said shank, a cylindrical piston electrode slidable in said cylinder and having an internally-threaded bore receiving the threaded terminal portion of said shank, said piston carrying a member having a non-circular aperture in communication with said threaded bore, and an end cap secured to the end of said cylinder opposite said bore and having a longitudinally-extending post of non-circular cross-section, said post fitting slidably within said non-circular aperture and preventing rotation of said piston electrode within said cylinder whereby said piston electrode is moved longitudinally through said cylinder when the shank is rotated, the threaded terminal portion of said bore having a transverse slot therein, the free end of said post engaging the free end of said threaded terminal portion, said shank having a rectangular intermediate portion, a first washer having a rectangular groove making a snap-fit with said intermediate portion for mounting said first washer thereon, said shank also having a terminal portion of non-circular cross-section adjacent the head thereof, a second washer having a non-circular aperture receiving said terminal shank portion, and a compression spring seated at one end thereof on the first washer and at the other end thereof on the second washer and urging said shank inwardly of said cylinder with said threaded terminal portion in pressing engagement with said post to compress said transverse slot.

References Cited in the file of this patent

UNITED STATES PATENTS

| | | |
|---|---|---|
| 2,607,826 | Barnes | Aug. 19, 1952 |
| 2,747,147 | Shull | May 22, 1956 |
| 3,071,716 | Young | Jan. 1, 1963 |
| 3,100,856 | Barnes | Aug. 13, 1963 |

FOREIGN PATENTS

| | | |
|---|---|---|
| 263,948 | Great Britain | Jan. 10, 1927 |
| 743,842 | Germany | Jan. 4, 1944 |